United States Patent [19]
Gibbons

[11] Patent Number: 5,064,210
[45] Date of Patent: Nov. 12, 1991

[54] UNICYCLE APPARATUS

[76] Inventor: Rex Gibbons, Rte. 5, Box 17, New London, Wis. 54961

[21] Appl. No.: 555,183

[22] Filed: Jul. 20, 1990

[51] Int. Cl.$^5$ .............................................. B62K 1/00
[52] U.S. Cl. .................................................. 280/206
[58] Field of Search ................................. 280/206–208

[56] References Cited

U.S. PATENT DOCUMENTS

| | | | |
|---|---|---|---|
| 948,859 | 2/1910 | Jackulvis | 280/207 |
| 3,380,755 | 4/1968 | Pound | 280/207 |
| 4,102,542 | 7/1978 | Pirre Jr. et al. | 280/207 |

FOREIGN PATENT DOCUMENTS 0127311  4/1948  Australia ............................ 280/207
0048125 12/1888  Fed. Rep. of Germany ...... 280/208
2526747 11/1983  France ................................ 280/206

Primary Examiner—Kenneth R. Rice
Assistant Examiner—Paul Dickson
Attorney, Agent, or Firm—Leon Gilden

[57] ABSTRACT

An apparatus including an exterior annular wheel rotatably mounted relative to an inner semi-annular rim rotatably mounted interiorly of the wheel, with a framework mounting a seat and handle bars spaced relative to one another defining a gap therebetween, including a top sprocket driven to rotate a bottom sprocket to rotate an associate annular gear rack mounted to the annular wheel, with a right and left brake pad selectively actuated at the handle bar structure to effect turning of the organization upon actuation of the brake pads.

5 Claims, 5 Drawing Sheets

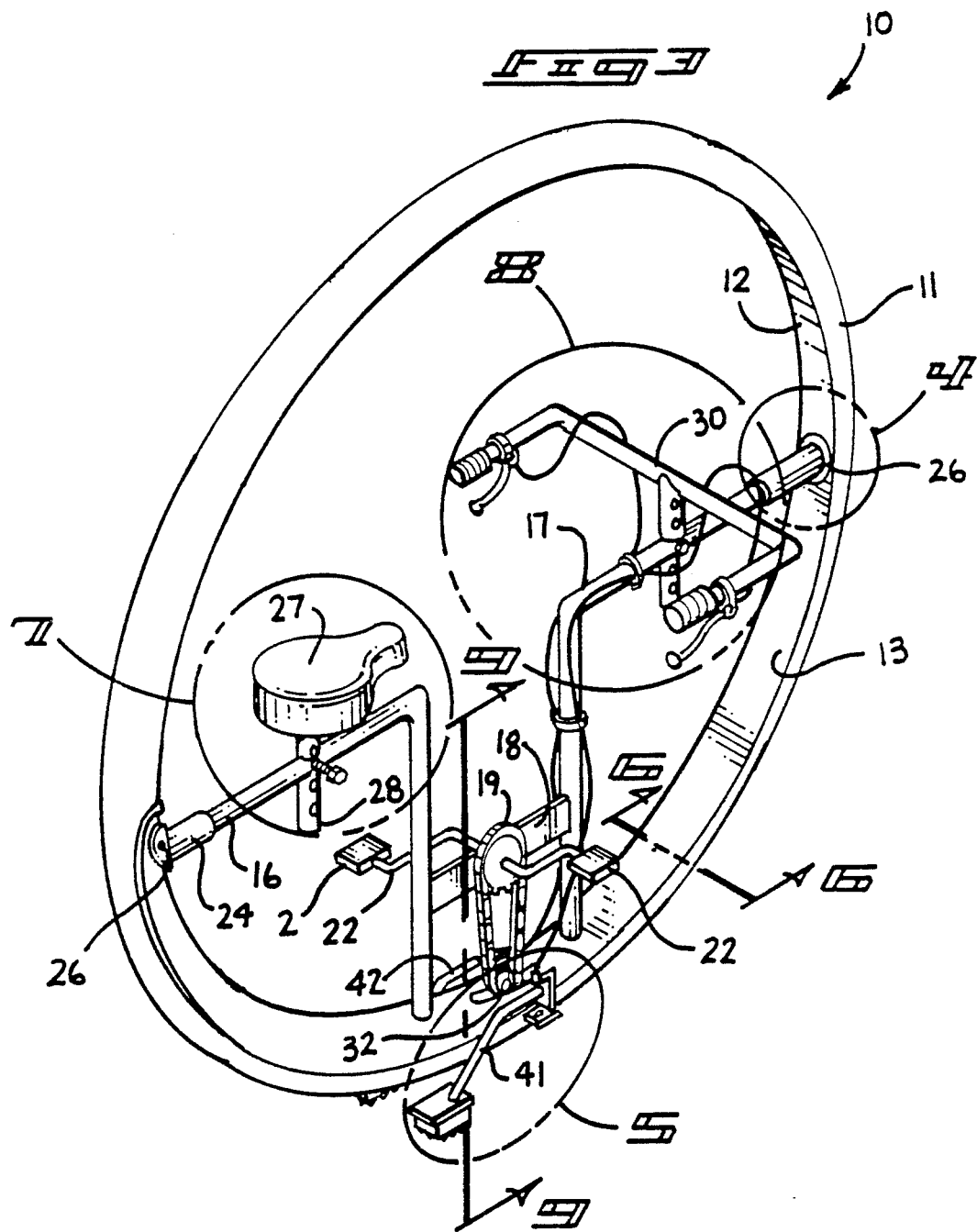

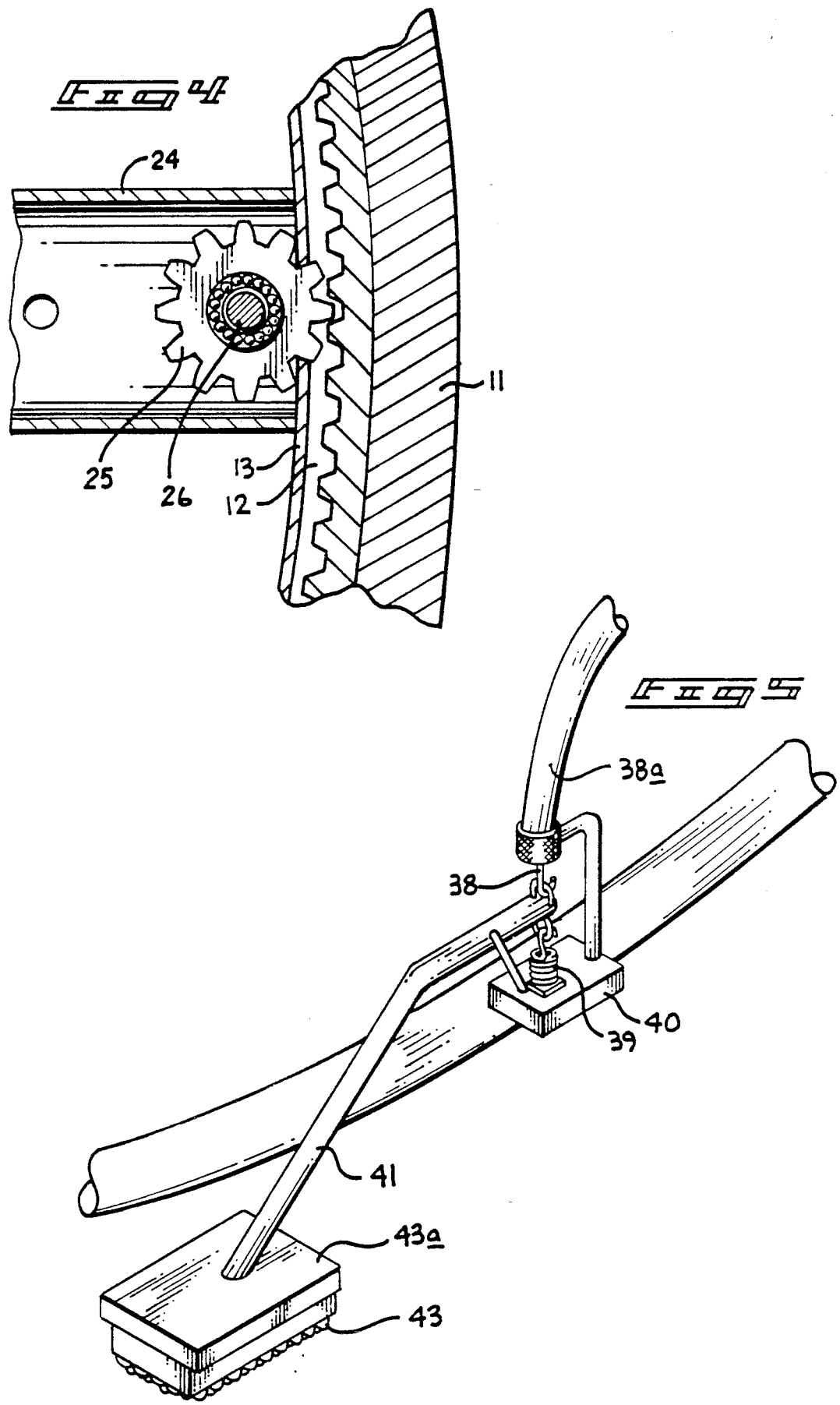

UNICYCLE APPARATUS

BACKGROUND OF THE INVENTION

1. Field of the Invention

The field of invention relates to unicycle construction, and more particularly pertains to a new and improved unicycle apparatus wherein the same provides a compact integral organization with mounting for an individual therewithin to permit selective rotation of an exterior wheel relative to an interior rim utilizing brake pad members to effect turning of the organization.

2. Description of the Prior Art

Unicycle structure of various types has been set forth in the prior art. Heretofore, unicycle organizations have been of relatively complex and elaborate construction, as opposed to that set forth by the instant invention. Examples of prior art structures may be found in U.S. Pat. No. 91,535 to Greene, et. al. utilizing hand and foot cranks mounted within a rim to effect rotation of the organization.

U.S. Pat. No. 396,349 to Behr provides a unicycle organization providing a seating structure coaxially offset relative to a wheel structure and counterbalanced by a drive organization coaxially offset in opposed orientation relative to the seat organization to effect rotation of the rim portion of the organization.

U.S. Pat. No. 258,207 to Ahlert sets forth a unicycle organization wherein in a drive mechanism is mounted centrally of the apparatus utilizing relatively complex crank structure to effect rotation of the wheel organization.

U.S. Pat. No. 511,139 to Harper sets forth a further example of a unicycle organization utilizing relatively elaborate crank structure to effect rotation of an associated wheel mounted to the rim structure of the organization.

U.S. Pat. No. 92,044 to Hale sets forth a further example of a generally elliptically configured cage network mounting a seat and peddle structure medially thereof to effect rotation of the unicycle wheel apparatus.

As such, it may be appreciated that there continues to be a need for a new and improved unicycle apparatus wherein the same addresses both the problems of ease of use as well as effectiveness in construction in arranging a compact aligned organization and in this respect, the present invention substantially fulfills this need.

SUMMARY OF THE INVENTION

In view of the foregoing disadvantages inherent in the known types of unicycle apparatus now present in the prior art, the present invention provides a unicycle apparatus wherein the same provides a compact unitary unicycle organization to effect relative rotation of an exterior wheel relative to an interior semi-annular rim to effect rotation of the exterior wheel and effect traverse of the organization overlying a surface to be traversed. As such, the general purpose of the present invention, which will be described subsequently in greater detail, is to provide a new and improved unicycle apparatus which has all the advantages of the prior art unicycle apparatus and none of the disadvantages.

To attain this, the present invention provides an apparatus including an exterior annular wheel rotatably mounted relative to an inner semi-annular rim rotatably mounted interiorly of the wheel, with a framework mounting a seat and handle bars spaced relative to one another defining a gap therebetween, including a top sprocket driven to rotate a bottom sprocket to rotate an associated annular gear rack mounted to the annular wheel, with a right and left brake pad selectively actuated at the handle bar structure to effect turning of the organization upon actuation of the brake pads.

My invention resides not in any one of these features per se, but rather in the particular combination of all of them herein disclosed and claimed and it is a distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstact is to enable to U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved unicycle apparatus which has all the advantages of the prior art unicycle apparatus and none of the disadvantages.

It is another object of the present invention to provide a new and improved unicycle apparatus which may be easily and efficiently manufactured and marketed.

It is a further object of the present invention to provide a new and improved unicycle apparatus which is of a durable and reliable construction.

An even further object of the present invention is to provide a new and improved unicycle apparatus which is susceptible of a low cost of manufacture with regard to both materials and labor, and which accordingly is then susceptible of low prices of sale to the consuming public, thereby making such unicycle apparatus economically available to the buying public.

Still yet another object of the present invention is to provide a new and improved unicycle apparatus which provides in the apparatuses and methods of the prior art some of the advantages thereof, while simultaneously overcoming some of the disadvantages normally associated therewith.

Still another object of the present invention is to provide a new and improved unicycle apparatus wherein the same medially positions a drive arrangement relative to an interior rim to effect relative rotation of an exterior wheel mounted coaxially of the rim by a direct sprocket inter-engagement with an associated annular gear rack mounted to the exterior wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a isometric illustration of the instant invention.

FIG. 4 is an orthographic cross-sectional view, of section 4, as set forth in FIG. 3.

FIG. 5 is an isometric illustration of section 5 as set forth in FIG. 3.

DESCRIPTION OF THE PREFERRED EMBODIMENT

Figure 1:
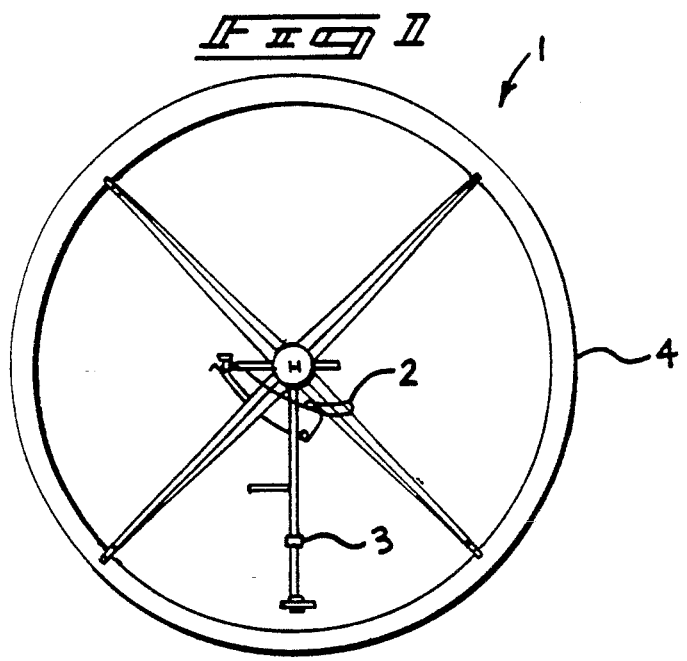
FIG. 1 is an orthographic view, taken in elevation, of a prior art unicycle apparatus.
Figure 2:
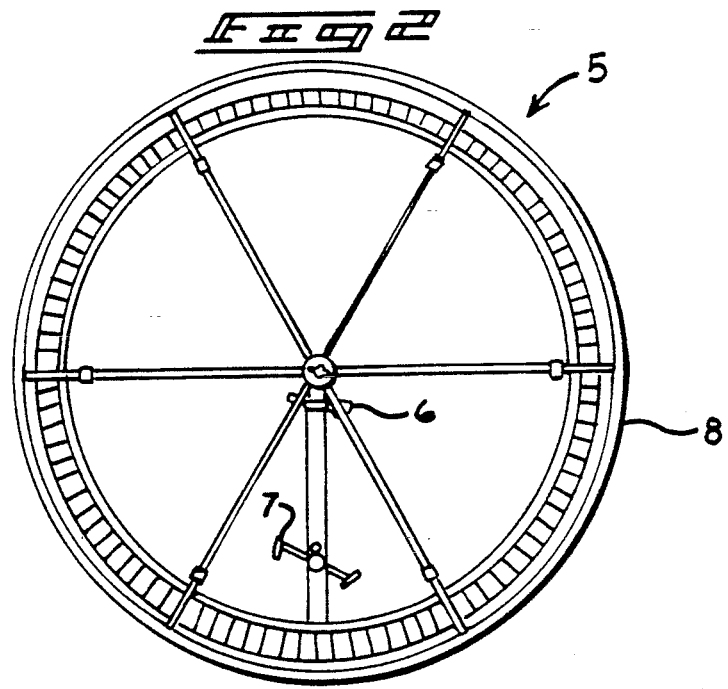
FIG. 2 is an orthographic side view, taken in elevation, of a further prior art unicycle apparatus.
Figure 6:
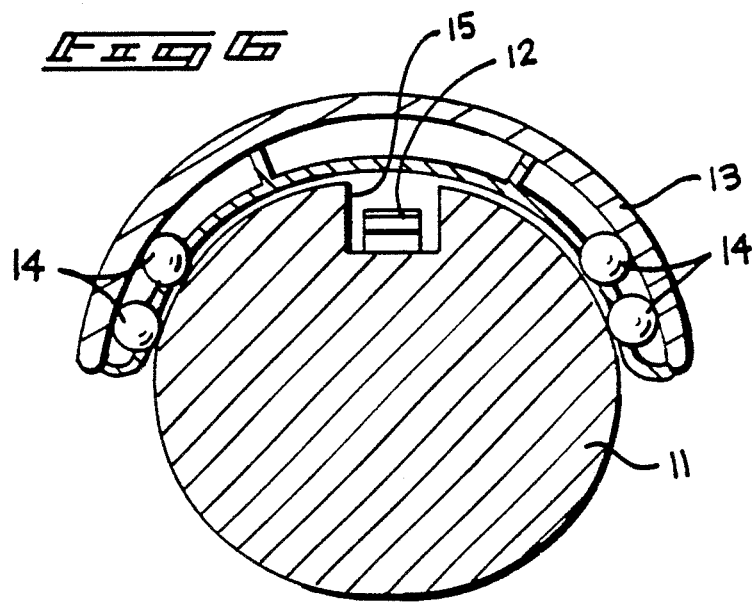
FIG. 6 is an orthographic cross-sectional view, taken along the lines 6—6 of FIG. 3, in the direction indicated by the arrows.
Figure 7:
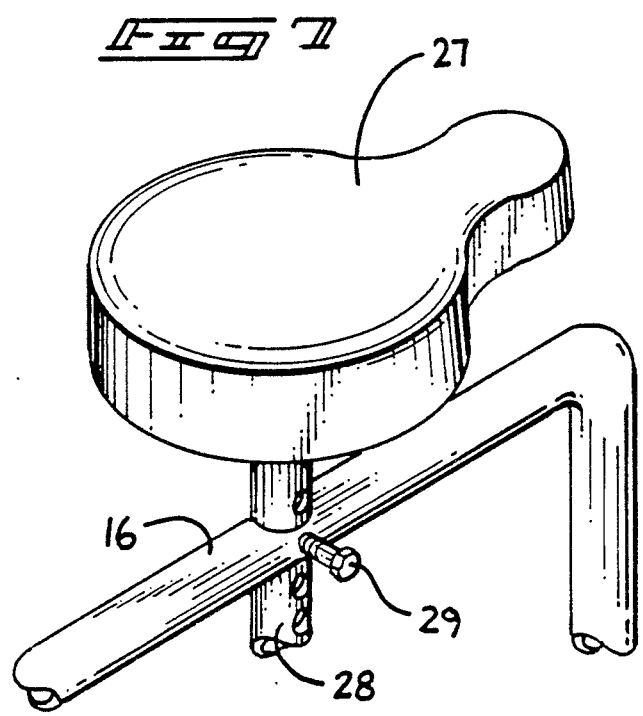
FIG. 7 is an isometric illustration, somewhat enlarged, of the seat apparatus as set forth in section 7 of FIG. 3.

With reference now to the drawings, and in particular to FIGS. 1 to 9 thereof, a new and improved unicycle apparatus embodying the principles and concepts of the present invention and generally designated by the reference numeral 10 will be described.

FIG. 1 illustrates a prior art unicycle apparatus 1 utilizing an exterior wheel mounted to an interior framework structure, wherein a seat 2 overlies a peddle structure 3 to effect rotation of the wheel 4. Similarly, the prior art structure of FIG. 2 sets forth a unicycle organization 5 utilizing an exterior wheel 8 actuated through a diametrically aligned seat 6 and peddle structure 7.

More specifically, the unicycle apparatus 10 of the instant invention essentially comprises an annular wheel 11 mounted coaxially and exteriorly of a semi-annular interior rim 13, with an annular gear rack 12 (see FIGS. 3, 4, and 6) mounted to an interior surface of the annular wheel 11 positioned within a recessed annular groove 15, and rotatably mounted relative to the semi-annular rim 13 by captured bearings 14 mounted within the semi-annular rim 13 cooperative with a rear exterior surface of the wheel 13.

A first "L" shaped frame 16 mounted in planar alignment with a second "L" shaped frame 17 defines a gap therebetween, with a spanner frame leg 18 mounted between the gap underlying top horizontal legs of each of the first and second "L" shaped frames. The horizontal legs of the first and second "L" shaped frames are generally aligned diametrically relative to one another within a common diameter defined by the semi-annular interior rim 13 and the annular wheel 11. It is accordingly appreciated that the semi-annular rim structure 13 in association with the framework positions the center of gravity of the organization in a vertically lowered orientation, as opposed to a full interior room structure, as opposed to the semi-annular interior rim 13. The spanner frame leg 18 includes a crank member 22 directed therethrough rotatably mounted through the spanner frame leg 18 and fixedly secured thereto a top sprocket 19. The top sprocket 19 is in operative engagement with a driven sprocket 31 (see FIG. 9). The driven sprocket is coaxially aligned with and offset relative to a bottom sprocket 20. The bottom sprocket 20 is directed through an interior rim and enclosed slot 32 directed through the interior rim 13 to permit operative engagement with the bottom sprocket 20, with the annular gear rack 12 to effect relative rotation of the gear rack relative to the sprocket 20 during rotation of the crank member 22 upon actuation of the peddle platforms 23 mounted at opposed terminal ends of the crank member 22, as illustrated.

Alignment of the semi-annular interior rim 13 with the exteriorly oriented annular wheel 11 is effected through positioning sprockets 25 (see FIG. 4), wherein the positioning sprockets 25 are rotatably mounted within sleeve members 24 mounted to terminal ends of the horizontal legs of the first and second "L" shape frames 16 and 17, with the sleeve members 24 fixedly mounted to the interior rim 13, with each positioning sprocket 25 directed through the interior rim 13 in engagement with the annular gear rack 12. The positioning sprockets 25 are rotatably mounted by positioning sprocket axles 26 diametrically projected through each of the sleeve members 24, as illustrated. Accordingly, the upper terminal ends of each "L" shaped frame member is in fixed engagement with the semi-annular rim 13, and the lower terminal ends of each "L" shaped frame member fixedly mounted to the semi-annular rim, wherein the vertical legs of each first and second "L" shaped frame member are each parallel to one another. The gap between the horizontal leg members permits ease of dismounting from an associated seat 27 mounted to the horizontal frame leg of the first "L" shaped frame 16. The seat 27 is mounted upon an apertured seat post 28 that is directed slidably to the horizontal leg of the first "L" shaped frame 16 and utilizes a positioning pin 29 to vertically position the seat 27 relative to the horizontal leg of the first "L" shaped frame 16.

Handle bars 30 are vertically positionable relative to the horizontal leg of the second "L" shaped frame 17 utilizing an apertured handle bar support post 33 and a forward positioning pin 34 directed through the apertured post 33 and the horizontal leg of the second "L" shaped frame 17 to effect the vertical positioning as noted.

Figure 8:
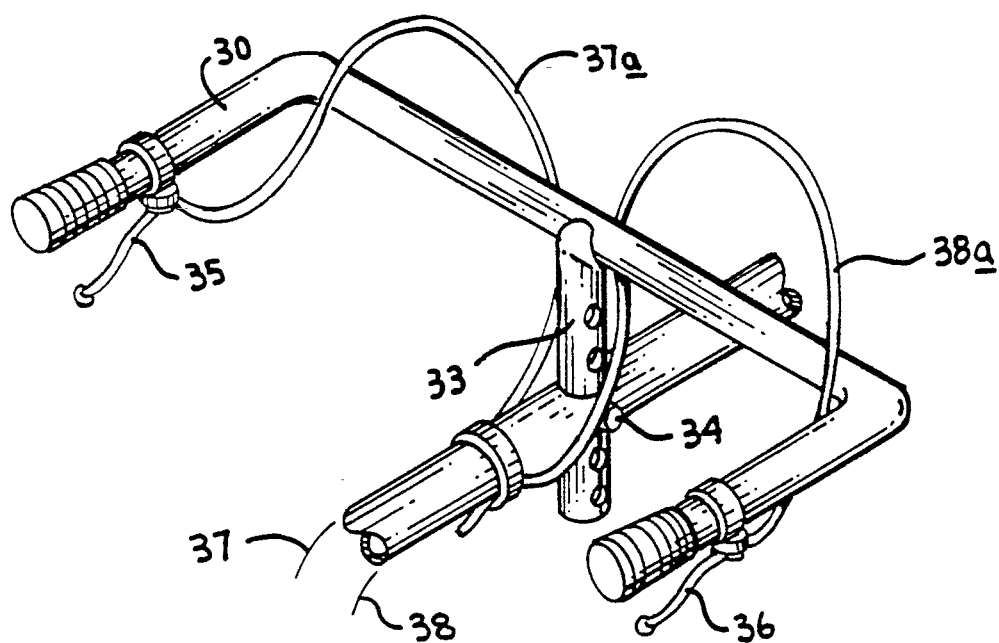
FIG. 8 is an isometric illustration, somewhat enlarged, of the section 8 as set forth in FIG. 3.
Figure 9:
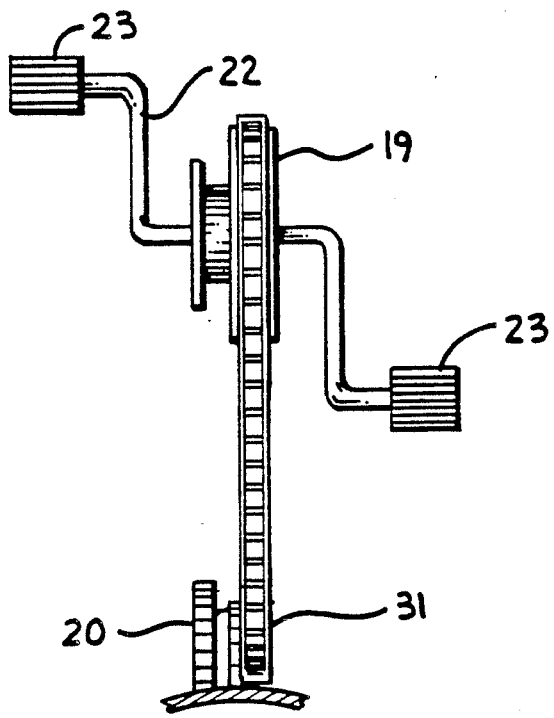
FIG. 9 is an orthographic view, taken along the lines 9—9 of FIG. 3, in the direction indicated by the arrows.

With reference to FIG. 8, a right and left respective brake lever 35 and 36 is mounted to each respective leg of the "U" shaped handle bar organization 30. The right and left brake levers 35 and 36 effect reciprocation of a respective left and right brake cable 37 and 38 slidably mounted within respective left and right sheath 37a and 38a. As exemplified in FIG. 5, a right brake leg 41 cooperates with a left brake leg 42 (see also FIG. 3), wherein each right and left brake leg 41 and 42 respectively are pivotally actuated by each respective right and left brake cable 38 and 37. Upon retraction of the right brake cable 38 within its respective right sheath 38a, the right brake leg 41 is pivoted downwardly to effect engagement of an associated brake pad 43 mounted upon a foot member 43a of the right brake leg 41 through a pivot link 44 pivotally mounting the right brake leg relative to the interior rim 13 and the associated brake mounting block 40 that is fixedly mounted to the interior rim 13. A similar brake mounting block 40 and associated pad structure 43 and 43a is understandably utilized by the left brake leg 42.

It should also be understood that the top sprocket 19 is of a multiplied greater diameter than that of the driven sprocket 31 and the bottom sprocket 20. It is also understood that the relative diameters of the sprockets may be altered to effect torque multiplication directed to the annular gear rack 12 upon rotation of the crank member 22 by the associated peddle platform 23.

As to the manner of usage and operation of the instant invention, the same should be apparent from the above disclosure, and accordingly no further discussion relative to the manner of usage and operation of the instant invention shall be provided.

With respect to the above discription then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A unicycle apparatus comprising, in combination,
    an annular continuous wheel, including a semi-circular interior rim, wherein the annular wheel is rotatably mounted relative to the inteior rim, and
    a first frame member mounted fixedly to the interior rim spaced from a second frame member fixedly mounted to the interior rim, wherein the first and second frame members are spaced relative to one another, and
    a drive sprocket fixedly mounted between the first and second frame members, and
    a seat mounted to the first frame member, and
    a handle bar mounted to the second frame member, and
    a driven sprocket mounted underlying the drive sprocket, and
    the driven sprocket including a bottom sprocket, the bottom sprocket in cooperative relationship with a gear means, wherein the gear means is positioned for operative association with the bottom sprocket to effect relative rotation of the annular wheel relative to the interior rim, and
    wherein the annular wheel includes a continuous annular groove directed through an interior surface of the annular wheel, with the gear means including a continuous annular gear rack mounted within the continuous groove of the annular wheel, and the gear rack in inter-engaged relationship with the bottom sprocket, and
    including a continuous chain directed about the drive sprocket and the driven sprocket, and
    wherein the first frame member includes an "L" shaped frame and the second frame member includes an "L" shaped frame, and the first and second "L" shaped frames each include a first and second respective horizontal frame leg, and wherein the first and second horizontal frame legs are diametrically aligned relative to one another and fixedly mounted to the interior rim, and the first and second "L" shaped frame each include a vertical frame leg, wherein the first and second vertical frame legs are parallel relative to one another, and a spanner frame leg orthogonally mounted between the first and second vertical frame legs, and a crank member rotataly mounted through the spanner frame leg, and the drive sprocket fixedly mounted to the crank member, and the crank member including a peddle platform rotatably mounted to each terminal end of the crank member to effect relative rotation of the crank member relative to the spanner frame leg, and
    wherein the first horizontal frame leg includes the seat mounted adjustably thereto, the seat including an apertured seat post, and the apertured seat post cooperating with a positioning pin, the positioning pin selectively positionable through the first horizontal frame leg and the apertured seat post to vertically position the seat relative to the first horizontal frame leg, and the handle bar defined by a "U" shaped handle bar member including an apertured handle bar post directed through the second horizontal frame leg, with a further positioning pin directed through the apertured handle bar post and the second horizontal frame leg to vertically position the "U" shaped handle bar relative to the second horizontal frame leg.

2. An apparatus as set forth in claim 1 wherein each first and second horizontal frame leg includes a positioning sprocket mounted rotatably between each terminal end of each first and second horizontal frame leg in rotative cooperative relationship with the gear rack, and each positioning sprocket is directed through the interior rim and is rotatably mounted adjacent each terminal end of the first and second horizontal frame leg to align the interior rim with the annular wheel.

3. An apparatus as set forth in claim 2 wherein the "U" shaped handle bar member includes a right and left leg, the right and left leg each include a respective right and left brake lever, the right and left brake lever including a respective right and left brake cable fixedly mounted to each respective right and left brake lever, and a respective lower terminal end of each right and left brake cable mounted to a respective right and left brake leg, and each respective right and left brake leg pivotally mounted relative to the interior rim, whereupon respective actuation of respective right and left brake lever effects respective pivotment of a respective right and left brake leg.

4. An apparatus as set forth in claim 3 wherein each right and left brake leg includes a return spring to bias each respective right and left brake leg upwardly relative to the interior rim, and each right and left brake leg includes a brake pad mounted to a free terminal end of each right and left brake leg.

5. An apparatus as set forth in claim 4 including bearing members mounted between the interior rim and the annular wheel to effect relative rotation between the gear rack and the annular wheel.

* * * * *